Dec. 10, 1957 C. M. TARIS ET AL 2,816,176

MEANS FOR ERASING A MAGNETIC RECORD

Filed July 15, 1954

INVENTORS C. M. TARIS
F. J. WOOLAM
BY V. P. Priolo
ATTORNEY

United States Patent Office 2,816,176
Patented Dec. 10, 1957

2,816,176

MEANS FOR ERASING A MAGNETIC RECORD

Charles M. Taris, Cranford, and Frank J. Woolam, East Orange, N. J., assignors to Bell Telephone Laboratories, Incorporated, New York, N. Y., a corporation of New York Application July 15, 1954, Serial No. 443,664

9 Claims. (Cl. 179—100.2)

Figures 1, 2:
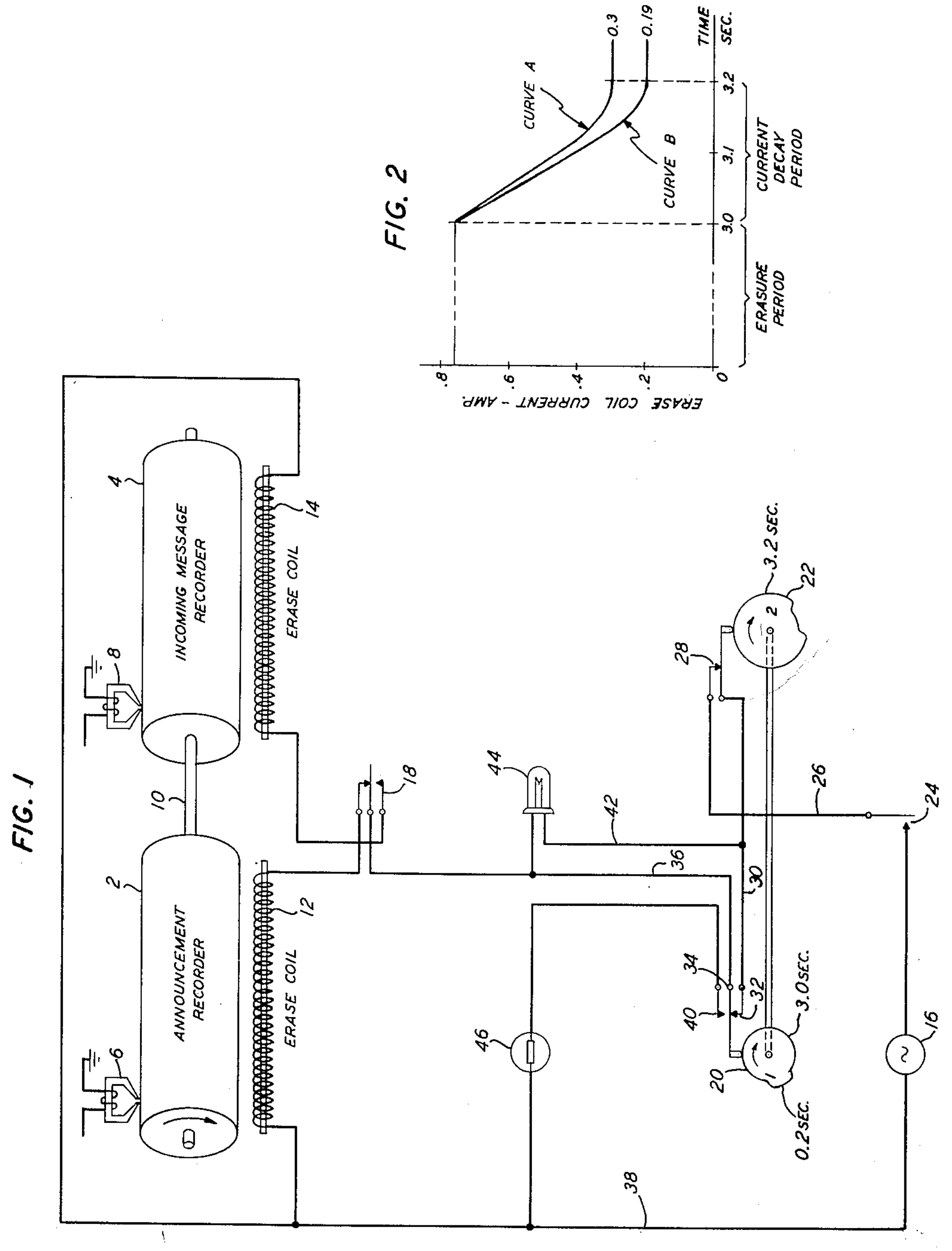

This invention relates to means for erasing a magnetic record by exposing said record to an alternating magnetic field which reaches saturation intensity and decreases to a low value over a number of cycles, and more particularly to means for controlling the decay of said alternating magnetic field after erasure of the record has been completed.

Magnetic recording facilities are provided in the telephone plant for furnishing short repetitive announcements such as are required for weather announcing service and the interception of telephone calls to vacant and unassigned numbers. They are also provided in telephone answering devices which automatically transmit a recorded message to and record a message from a calling subscriber. In these facilities it has been found desirable to dispose the record medium on the surface of a rotating cylinder and cause the record to occupy a helical track on said surface.

Difficulties are encountered in erasing this record with a separate erase head in accordance with conventional wire and tape recorder practice. It is very difficult, mechanically, to make the erase and record-reproduce heads trace identical helical paths during the entire operating cycle because there is of necessity a physical displacement between them. While it is conventional commercial practice to erase an old message and simultaneously record a new one, some applications in telephone work require the use of a separate erase cycle. When a conventional single track erase head is used, the erase operation requires as much time as a full recording cycle.

The foregoing difficulties can be overcome by erasing with a magnetic structure wide enough to cover the entire length of the recorded helix. Such a structure, which employs alternating current at a frequency of 60 cycles and accomplishes complete erasure in one revolution of the record cylinder, is included in the bulk demagnetizer disclosed in patent application Serial No. 250,860, filed by J. Z. Menard, on October 11, 1951.

With the device referred to above the magnetic record is erased by moving a large erase solenoid, energized by 60 cycles per second current, close to the rotating magnetic record drum. After the record has been completely erased the erase coil is withdrawn a predetermined distance from the drum before it is deenergized. It is necessary to withdraw the coil before removing the current to avoid leaving a line of magnetization or "noise bar" across the face of the drum. If the erase structure was not withdrawn the section of record medium under the influence of the erase structure at the time it was deenergized would exhibit excessive noise in comparison with the remainder of the record medium which was subjected to the normal alternating-current erase.

The mechanism necessary for moving a large solenoid has been included successfully in devices such as the weather announcing machine. There are certain equipments, however, in which it is desirable to avoid the use of moving erase coils. Such an equipment is the automatic telephone answering set which, of necessity, must be as small and compact as possible since it is installed in the subscriber's home or office.

It is an object of this invention to provide means for achieving neutralization erase and demagnetization of a rotating magnetic record medium with a stationary erase coil.

It is a further object of this invention to achieve neutralization erase and demagnetization of a rotating magnetic record medium by controlling the decay of the alternating erase current in a stationary erase coil after erasure of the record has been completed.

In accordance with the general features of this invention these objectives are accomplished by first applying alternating erase current to a stationary coil disposed adjacent the rotating magnetic record during at least one complete revolution of the record, and then inserting a nonlinear resistor having a positive temperature-resistance characteristic in series between the erase coil and the source of erase current and a nonlinear resistor having a negative characteristic in shunt with the erase coil.

These and other features of the invention will be more clearly understood from the following detailed description and the accompanying drawings in which:

Fig. 1 is a schematic of the electrical control system for energizing the erase coil and controlling the decay of the erase current; and Fig. 2 is a diagram showing the rate of decay of the erase current after the erase cycle has been completed.

Referring now to the accompanying drawings the structure comprising the announcement record drum 2, the incoming message record drum 4 and the magnetic record-reproduce heads 6 and 8 may be similar to that employed in the automatic telephone answering device disclosed in patent application Serial No. 331,157 filed by C. R. Keith and C. A. Nickerson on January 14, 1953.

As shown in application Serial No. 331,157, drums 2 and 4 are supported by shaft 10 in such manner as to be free to rotate on the shaft independently or be driven independently by clutch means attached to the shaft, and means are provided for simultaneously moving the record-reproduce head directly associated with the rotating drum.

Erase coils 12 and 14 are energized by current from the 60-cycle current source 16. Switch 18 may be manually or automatically operated to select the coil which is to be energized. The erase cycle is measured by means of cams 20 and 22. Cam 20 comprises two segments, the larger one corresponding to the time required for either of the record drums 2 and 4 to rotate at least one complete revolution and thereby accomplish complete erasure of the magnetic record, and the smaller one corresponding to the time required to decay the erase current in the erase coil. Cam 22 comprises a segment which corresponds to the total time of the erase and decay cycle, that is, the total time required for one complete revolution of cam 20. Cams 20 and 22 may be mounted on the same shaft and may be driven by the means which drives the shaft 10.

On closing switch 24, manually or automatically, erase current from the source 16 is applied to either coil 12 or 14 over the path including conductor 26, closed switch 28, conductor 30, contact 32 of switch 34, conductor 36, switch 18 and conductor 38. After the record drum related to the energized coil has made at least one complete revolution the record thereon will have been completely erased and cam 20 will operate to open contact 32. Erase current is now applied to the erase coil over the path including conductor 26, switch 28, conductor 30, conductor 42, nonlinear resistor 44, conductor 36, switch 18 and conductor 38. By closing contact 40 on opening contact 32 the nonlinear resistor 46 may also be included in the erase circuit to shunt the erase coil. After cam 20 has made a complete revolution, cam 22 operates to open switch 28 and thereby open the path over which current is supplied to the erase coil.

The nonlinear resistor 44 has a positive characteristic, that is, its hot resistance is much greater than its cold resistance. The range of resistance of the particular resistor to be used is established by the erase current, the spacing between record drum and erase coil and the erase current decay characteristic, as shown in curve A of Fig. 2, which will result in a negligible noise bar on the record medium.

In the particular embodiment of the invention shown in Figs. 1 and 2 the time required by each of the record drums to complete one revolution is 3 seconds and the noise bar is made negligible by using a nonlinear resistor having a cold resistance of 23 ohms and a hot resistance of 270 ohms. The time interval between the completion of one revolution of the record drum and the establishment of the final steady state value of erase current is two-tenths of a second or the time required by the record drum to complete one-fifteenth of a revolution. It has been found that if the final value of erase current is approximately 40 percent of the nominal erase current, the noise bar remaining on the magnetic record will be negligible.

While the rate of erase current decay provided by resistor 44, as shown in curve A, left only a negligible noise bar on the record medium, it was found that control of the erase current decay could be improved to provide a lower final value of erase current by simultaneously shunting the erase coil with a nonlinear resistor having a negative characteristic. As the temperature of this resistor 46 increases its resistance decreases.

Curve B of Fig. 2 shows the erase current decay characteristic which is obtained when both resistors 44 and 46 are used as shown in Fig. 1. It will be seen that a greater reduction of the erase current can be achieved in the same time interval, namely two-tenths of a second. In the particular embodiment of the invention shown in Figs. 1 and 2 resistor 46 is a thermistor having a negative resistance-temperature coefficient per degree centigrade at 25 degrees centigrade of 4.4 percent.

A transformer may be used individually in conjunction with nonlinear resistor 44 and/or nonlinear resistor 46 to match the intrinsic range of resistance of the resistors to the range of resistance required for optimum erase coil current decay. The primary of the transformer is connected into the circuit of Fig. 1 in place of the nonlinear resistor while said resistor is connected across the secondary. Matching is controlled by the primary to secondary turns ratio. The transformer, when used with a positive characteristic nonlinear resistor whose cold resistance is very low behaves like a saturable-core reactor-variable inductor. The primary of the transformer thus displays a nonlinear impedance, an impedance that is a function of time and increases with time.

Elements 44 and 46 need not be restricted to nonlinear resistors. Element 44 may be a nonlinear impedance device having a positive characteristic (its impedance increases with time) such as a nonlinear inductor or a semiconductor, ferroelectric device. Element 46 may be a nonlinear impedance device having a negative characteristic (its impedance decreases with time) such as a nonlinear capacitor, or a semiconductor ferroelectric device. The choice of whether element 44 is to be used alone or in combination with element 46 is dependent upon the desired rate and magnitude of erase coil current decay.

It is to be understood that the above-described arrangements are illustrative of the application of the principles of the invention. Other arrangements may be devised by those skilled in the art without departing from the spirit and scope of the invention.

What is claimed is:

1. Means for erasing a rotating magnetic record medium comprising a stationary erase coil disposed adjacent said record medium and extending across the width of the record bearing surface of said medium, a source of alternating erase current, a nonlinear impedance device having a positive temperature coefficient of resistance, a closed first current path including said erase coil and said source of current, a second current path including said erase coil, said source of current and said impedance device, means for rendering said first current path ineffective and said second current path effective after a first predetermined period of time, means for rendering said second current path ineffective after a second predetermined period of time.

2. Means for erasing a rotating magnetic record medium comprising a stationary erase coil disposed adjacent said record medium and extending across the width of the record bearing surface of said medium, a source of alternating erase current, a first nonlinear impedance device having a positive temperature coefficient of resistance, a second nonlinear impedance device having a negative temperature coefficient of resistance, a closed first current path including said erase coil and said source of current, a second current path including said source of current, said first impedance device and said erase coil and second impedance device connected in parallel, means for rendering said first current path ineffective and said second current path effective after a first predetermined period of time, means for rendering said second current path ineffective after a second predetermined period of time.

3. Means for erasing a rotating magnetic record medium comprising a stationary erase coil disposed adjacent said record medium and extending across the width of the record bearing surface of said medium, a source of alternating erase current, a nonlinear resistor having a positive temperature coefficient of resistance, a closed first current path including said erase coil and said source of current, a second current path including said erase coil, said source of current and said resistor, means for rendering said first current path ineffective and said second current path effective after a first predetermined period of time, means for rendering said second current path ineffective after a second predetermined period of time.

4. Means for erasing a rotating magnetic record medium comprising a stationary erase coil disposed adjacent said record medium and extending across the width of the record bearing surface of said medium, a source of alternating erase current, a nonlinear resistor having a positive temperature coefficient of resistance, means for connecting said erase coil directly to said source of alternating current, means for maintaining said direct connection for a first predetermined period of time and then inserting said resistor in series with said coil and said source of alternating current for a second predetermined period of time.

5. Means for erasing a magnetic record medium in accordance with claim 2 wherein the frequency of the alternating erase current is substantially 60 cycles per second.

6. Means for erasing a rotating magnetic record medium comprising a stationary erase coil disposed adjacent said record medium and extending across the width of the record bearing surface of said medium, a source of alternating erase current, a first nonlinear resistor having a positive temperature coefficient of resistance, a second nonlinear resistor having a negative temperature coefficient of resistance, a closed first current path including said erase coil and said source of current, a second current path including said source of current, said first resistor and said erase coil and second resistor connected in parallel, means for rendering said first current path ineffective and said second current path effective after a first predetermined period of time, means for rendering said second current path ineffective after a second predetermined period of time.

7. Means for erasing a rotating magnetic record medium comprising a stationary erase coil disposed adjacent said record medium and extending across the width of the record bearing surface of said medium, a source of alternating erase current, a first nonlinear resistor having a positive temperature coefficient of resistance, a second nonlinear resistor having a negative temperature coefficient of resistance, means for connecting said erase coil directly to said source of alternating current, means for maintaining said direct connection for a first predetermined period of time and then inserting said first resistor in series with said coil and said source of alternating current and said second resistor in shunt with said coil for a second predetermined period of time.

8. Means for erasing a rotating magnetic record medium comprising a stationary erase coil disposed adjacent said record medium and extending across the width of the record bearing surface of said medium, a source of alternating erase current, a nonlinear resistor having a positive temperature coefficient of resistance, a closed first current path including said erase coil and said source of current, a second current path including said erase coil, said source of current and said resistor, means for rendering said first current path ineffective and said second current path effective after a first predetermined period of time, means for rendering said second current path ineffective after a second predetermined period of time, the characteristic of said nonlinear resistor being such as to reduce the erase current substantially 60 percent within the time required by said rotating magnetic record to complete one-fifteenth of a revolution.

9. Means for erasing a rotating magnetic record medium comprising a stationary erase coil disposed adjacent said record medium and extending across the width of the record bearing surface of said medium, a source of alternating erase current, a first nonlinear resistor having a positive temperature coefficient of resistance, a second nonlinear resistor having a negative temperature coefficient of resistance, a closed first current path including said erase coil and said source of current, a second current path including said source of current, said first resistor and said erase coil and second resistor connected in parallel, means for rendering said first current path ineffective and said second current path effective after a first predetermined period of time, means for rendering said second current path ineffective after a second predetermined period of time, the characteristics of said nonlinear resistors being such as to reduce the erase current substantially 75 percent within the time required by said rotating magnetic record to complete one-fifteenth of a revolution.

No references cited.